United States Patent
Oh

[19]

[11] Patent Number: 5,680,881
[45] Date of Patent: Oct. 28, 1997

[54] VALVE SYSTEM FOR HERMETIC RECIPROCATING COMPRESSOR

[75] Inventor: Won-Sik Oh, Seoul, Rep. of Korea

[73] Assignee: LG Electronics Inc., Seoul, Rep. of Korea

[21] Appl. No.: 708,508

[22] Filed: Sep. 5, 1996

[30] Foreign Application Priority Data

Sep. 5, 1995 [KR] Rep. of Korea ............ 1995-28909

[51] Int. Cl.⁶ ............................................. F16K 15/00
[52] U.S. Cl. .................. 137/533.19; 137/533; 137/535; 137/529; 137/514
[58] Field of Search ............... 137/533.17, 856, 137/857, 528, 535, 532, 529, 533, 514, 533.19; 251/337; 417/571

[56] References Cited

U.S. PATENT DOCUMENTS

| | | | |
|---|---|---|---|
| 2,019,747 | 11/1935 | Taylor | 137/856 |
| 2,161,769 | 6/1939 | Trask | 137/857 |
| 2,264,136 | 11/1941 | Karlberg | 137/535 |
| 4,628,963 | 12/1986 | Ishijima | 137/857 |
| 4,723,896 | 2/1988 | Fritchman | 137/857 |
| 4,778,360 | 10/1988 | Ikeda | 137/856 |
| 5,062,779 | 11/1991 | Da Costa | 137/856 |
| 5,099,886 | 3/1992 | Squirrell | 137/856 |
| 5,110,272 | 5/1992 | Peruzzi | 137/856 |
| 5,178,183 | 1/1993 | Kim | 137/857 |
| 5,209,260 | 5/1993 | Baek | 137/856 |
| 5,346,373 | 9/1994 | Riffe | 137/535 |
| 5,558,508 | 9/1996 | Sasano | 137/856 |

*Primary Examiner*—Denise L. Ferensic
*Assistant Examiner*—Ramyar M. Farid
*Attorney, Agent, or Firm*—Birch, Stewart, Kolasch & Birch, LLP

[57] ABSTRACT

The present invention relates to a valve system for the hermetic reciprocating compressor, and more particularly, to reduce the gap volume of the spouting hole so as to help smoothly spout out the refrigerant through the spouting hole formed at the valve plate, to increase the amount of the refrigerant to be sucked into the cylinder, to increase the density of the sucked refrigerant, and finally to improve the efficiency of the hermetic reciprocating compressor. This invention comprises refrigerant leakage preventive part formed on the upper side of the valve plate to prevent the leakage of the refrigerant being sucked into the cylinder placed in front of the suction valve; the spouting part to open and close the spouting hole formed within the refrigerant leakage preventive part; the elastic part on the spouting part to open and close the spouting hole by the gap of small pressure while maintaining the small interval with the spouting part; the movement height limiting part to restrict the movement height of the spouting part by inserting and connecting the limiting part with the refrigerant leakage preventive part; and the spouting valve breakaway preventive part to prevent the breakaway of the spouting valve which is opening and closing the spouting of the refrigerant at the lower part of the movement height limiting part.

10 Claims, 4 Drawing Sheets

5,680,881

VALVE SYSTEM FOR HERMETIC RECIPROCATING COMPRESSOR

BACKGROUND OF THE INVENTION

The present invention relates to a valve system for a hermetic reciprocating compressor, and more particularly, to a valve system for improving the efficiency of the hermetic reciprocating compressor by reducing the formation of a gap volume at the spouting hole established at the valve plate so as to smoothly spout out the refrigerant through the spouting hole.

Generally, the hermetic reciprocating compressor comprises a compressing part placed within a closed container and a motor part for driving the compressing part as shown in FIGS. 1 and 2.

The compressing part described above comprises the following:

A slider 6 functioning to shift the rotary motion of the crankshaft 5 into reciprocating motion; a piston 8 making a reciprocating motion within a cylinder 7 in which the slider is inserted; a suction valve limiter 9 established at the upper side of the cylinder 7; a suction valve 10 functioning to open and close the refrigerant at the cylinder 7. A suction valve spouting hole 10a is formed at the suction valve. A valve plate 11 restricting the movement of suction and spouting valves 10 and 12 is placed in front of the suction valve 10. The compressing part further comprises: a suction hole 11a established at the valve plate 11 to suck the refrigerant; a spouting hole 11b established at the valve plate 11 to spout out the refrigerant; a spouting valve 12 established between the valve plate 11 and the headcover 14 to open and close the spouting of the refrigerant; a spouting valve suction hole 12a established at the spouting valve 12; a packing cover 13 preventing the leaking of the refrigerant being spouted in front of the spouting valve 12; a packing cover suction hole 13a established at the packing cover 13; a headcover 14 covering the cylinder 7 in front of the packing cover 13; and a suction resonance tube 15 established at the headcover 14 to enable the suction of the refrigerant in the closed container into the headcover 14.

In addition, the motor part comprises a stator 3 connected to a frame 2 by bolts for generating magnetic force when power is supplied. The motor part further comprises: a rotor 4 to be rotated by the magnetic force of the stator 3, and a crankshaft 5 to be rotated by a shaft connected to the rotor 4.

Reference numeral 16 denotes the supporting spring for sustaining the compressing section and the motor part.

The following explains the motion of the original hermetic reciprocating compressor comprising the above-mentioned elements.

When the hermetic reciprocating compressor is supplied with the power, induction current is generated between the stator 3 and the rotor 4, thus rotate the rotor 4. With the rotation of the rotor 4, the crankshaft 5 connected to the rotor 4 starts to rotate. The slider 6 established at the upper side of the crankshaft 5 shifts the rotating motion of the crankshaft 5 into a reciprocating motion and subsequently inserts the crankshaft into the piston 8. The piston 8 then makes its reciprocating movement inside the cylinder 7.

When the piston 8 makes its reverse movement (suction stroke) inside the cylinder, the low-temperature and low-pressure refrigerant is sucked into the closed container 1 through the suction pipe installed at the closed container 1.

The low-temperature and low-pressure refrigerant is then sucked into the headcover 14 through the suction resonance tube 15 installed at the headcover 14.

When the piston 8 makes its reverse movement inside the cylinder 7, the low-temperature and low-pressure refrigerant sucked into the headcover 14, after passing through the spouting valve suction hole 12a formed at the spouting valve 12 via packing cover suction hole 13a formed at the packing cover 13, is sucked through the suction hole 11a formed at the valve plate 11. By the difference of pressure between the insides of the headcover 14 and the cylinder 7, the suction valve 10 is subsequently opened and permits suction of the low-temperature and low-pressure refrigerant into the cylinder 7 until the piston 8 reaches its bottom dead center.

At this time, as it was shown in FIG. 2, the suction valve 10 is checked by the suction valve limiter 9 established at the upper side of the cylinder 7.

When the piston 8 terminates its reverse movement (terminates the suction stroke) and starts the forward movement (compression stroke) inside the cylinder 7, the suction valve 10 is closed, and the low-temperature and low-pressure refrigerant is compressed into high-temperature and high-pressure refrigerant inside the cylinder 7.

When the refrigerant is compressed to high temperature and high-pressure inside the cylinder 7 and reaches a certain degree of pressure (termination of compression stroke), the internal pressure of the cylinder 7 becomes higher than that of the headcover 14, and thus, the high-temperature and high-pressure refrigerant opens the spouting valve 12 which is stopping the spouting hole 11b established at the valve plate 11, and subsequently spouts the high temperature and high pressure refrigerant out into the headcover 14.

After being spouted into the closed container 1, the high-temperature and high-pressure refrigerant which was spouted into the headcover 14 is then sent into a refrigerant cycle's condenser through a spouting pipe installed at the closed container 1.

However, due to the gap volume caused by the spouting hole being formed at the spouting valve limiter and the valve plate, and due to the resistance of flow caused during the passing of the spouted refrigerant at the spouting hole and due to the hardness of the spouting valve, the original hermetic reciprocating compressor had suffered from a problem which reduced the efficiency of the compressor. The problem of the compressor was the following: Because of the delay in the opening of the spouting valve, the refrigerant was over-compressed and was not spouted easily, thus the temperature of the refrigerant was also, because of the expansion of the refrigerant, the opening of the suction valve was delayed, and the amount of the refrigerant to be sucked into the cylinder was reduced while additionally thinning the density of the sucked refrigerant.

SUMMARY OF THE INVENTION

The main purpose of this invention is aimed at the providing of a valve system to improve the efficiency of the hermetic reciprocating compressor.

The renewed valve system is designed to reduce the gap volume of the spouting hole to make smooth the spouting of the refrigerant through the spouting hole established at the valve plate. This will increase the amount of the refrigerant to be sucked into the cylinder, and thereby, to increase the density of the sucked refrigerant.

The technical means for the attainment of the purpose of the present invention comprises the following elements: A spouting device to open and close the spouting hole at the valve plate restricting the movement of the suction and spouting valves; an elastic device placed on the spouting device to open and close the spouting device during low pressure for providing a small opening for the refrigerant; a height movement limiting device being inserted in the refrigerant leakage preventive device to restrict the movement height of the spouting device; and a spouting valve breakaway preventive device to prevent the breaking away of the spouting valve which is opening and closing the spouting of the refrigerant at the lower part of the movement height limiting device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

This present invention will become fully understood from the detailed description given hereinbelow and the accompanying drawings which are given by way of illustration only, and thus are not limitative of the present invention, and wherein.

(A) shows the frontal view of the compressing section.

(B) shows the side view of the compressing section.

DETAILED DESCRIPTION OF THE INVENTION

Figure 1:
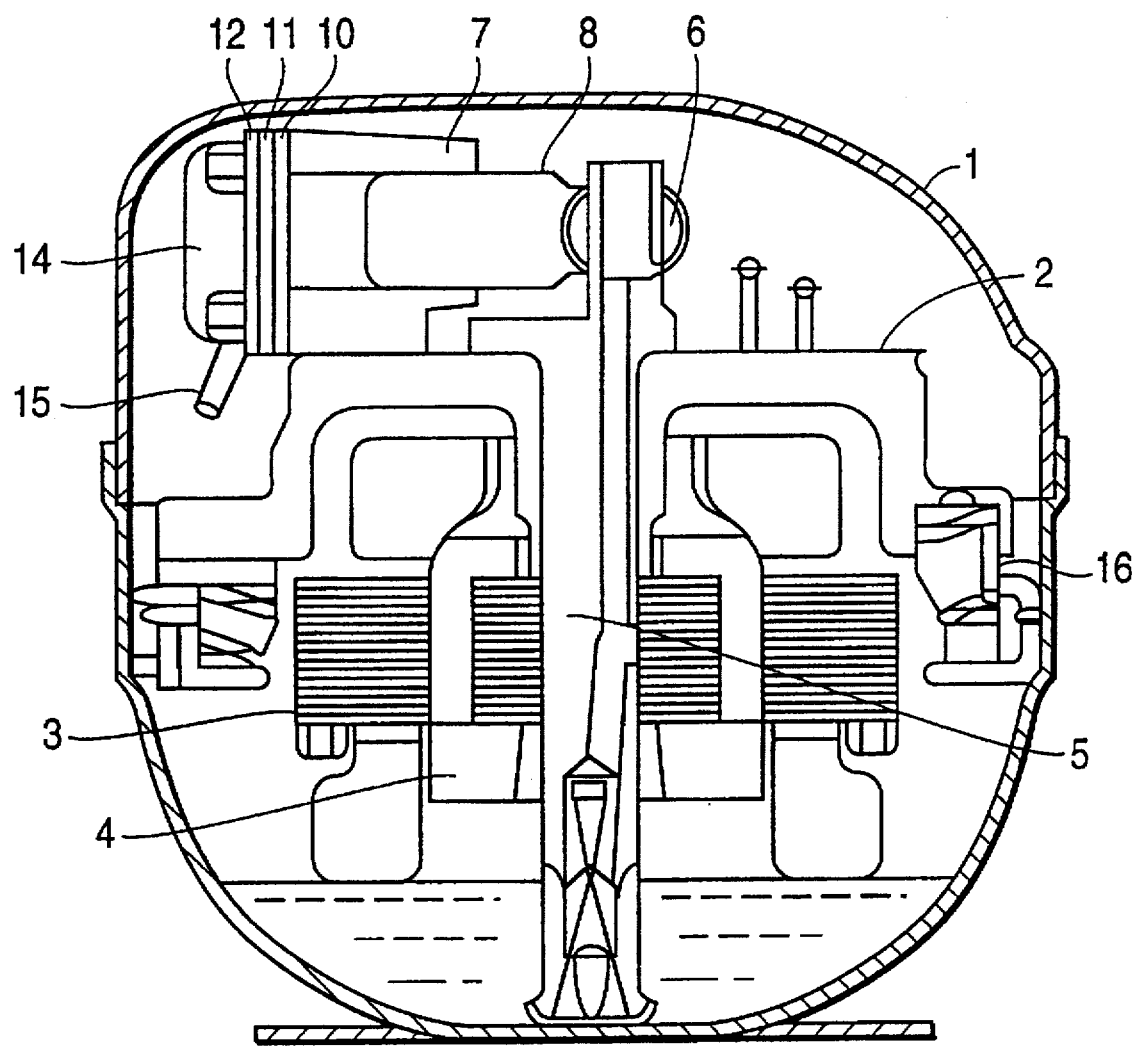
FIG. 1 shows the vertical section of the original hermetic reciprocating compressor.
Figure 2:
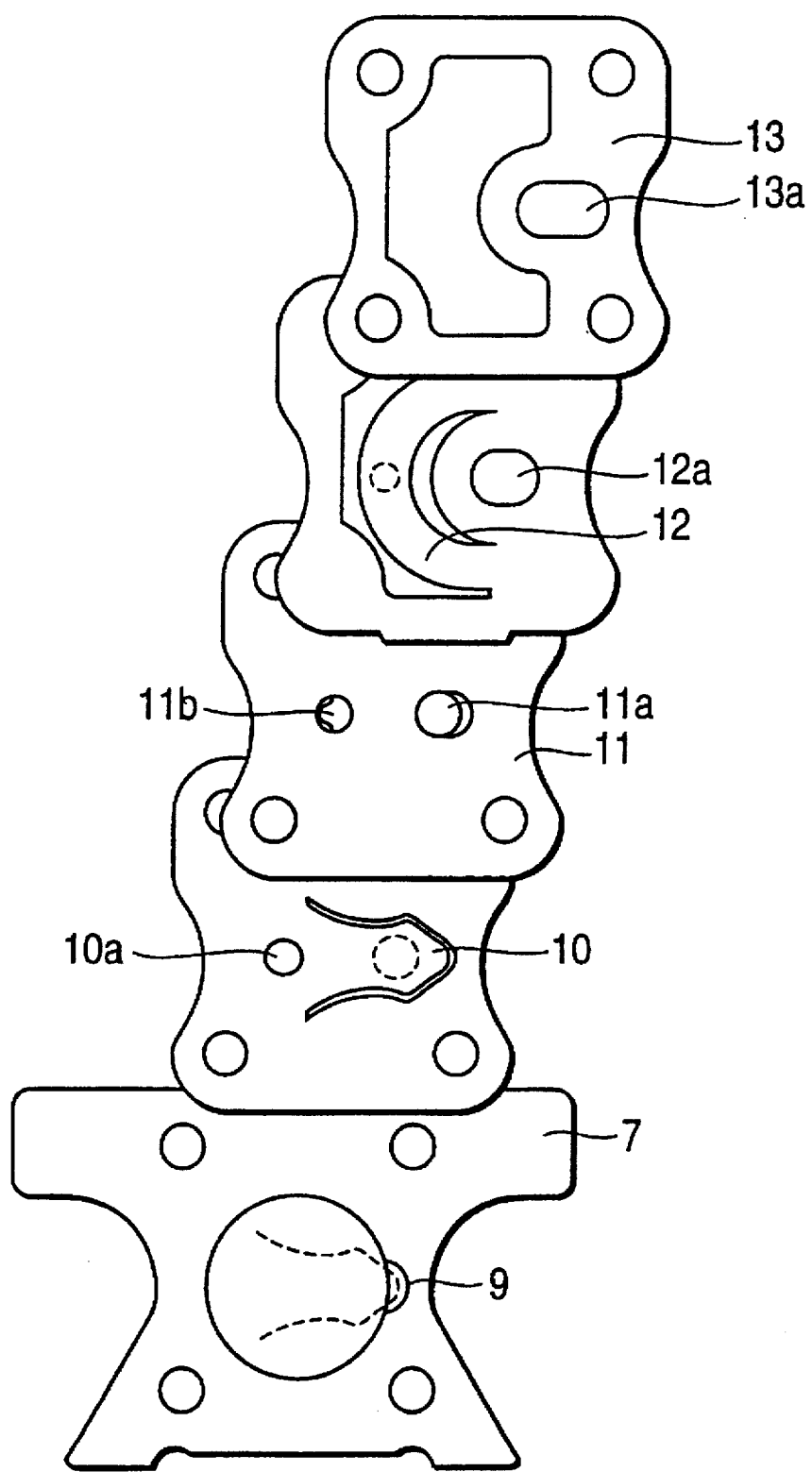
FIG. 2 shows the valve system of the original hermetic reciprocating compressor.
Figure 3:
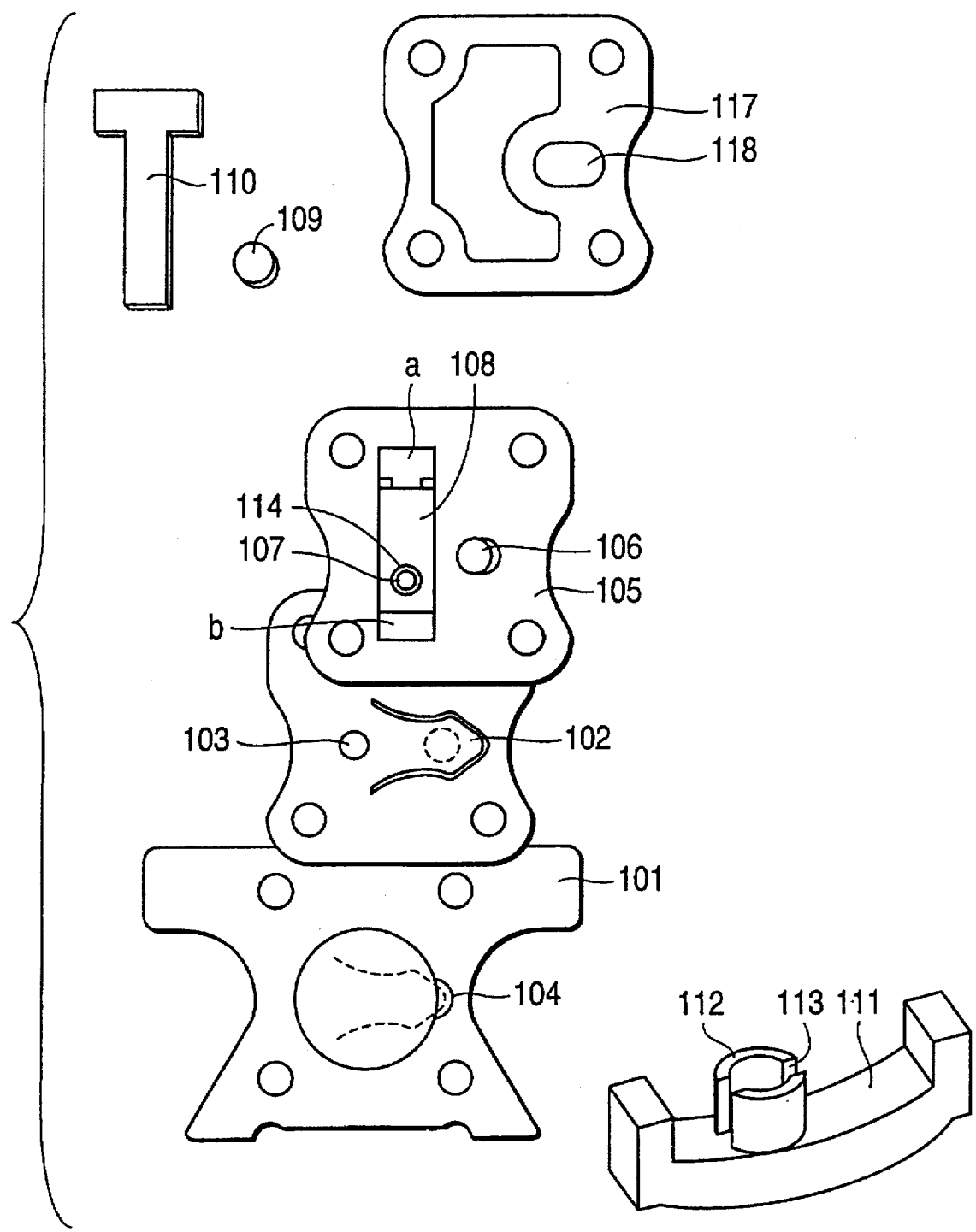
FIG. 3 shows the valve system of the newly invented hermetic reciprocating compressor.
Figure 4A:
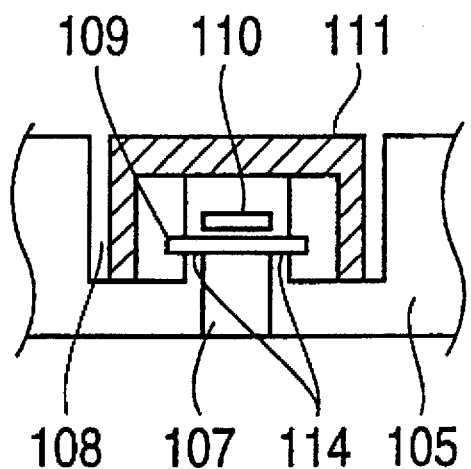
FIG. 4 is the extraction showing the compressing section of the newly invented hermetic reciprocating compressor.
Figure 4B:
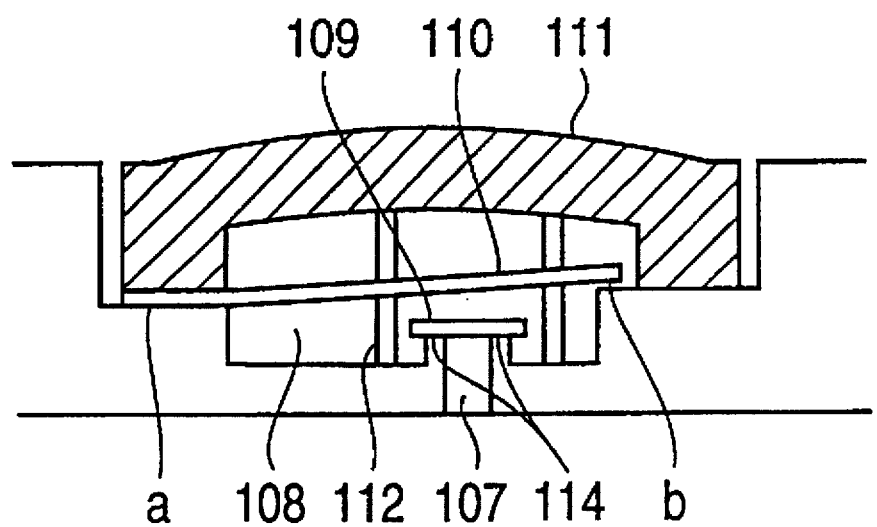

As shown in the FIGS. 3 and 4, the valve system of the newly invented hermetic reciprocating compressor comprises the following elements:

A cylinder 101 formed to enable the reciprocation of the piston, a suction valve limiter 104 formed on the cylinder 101 similar to the limiter. A suction valve 102 functions to open and close the suction of the refrigerant in front of the cylinder 101. A suction valve spouting hole 103 is formed at the suction valve 102, and a valve plate 105 functions to restrict the movement of the suction and spouting valves, 102 and 109 respectively, in front of the suction valve 102. A suction hole 106 is formed at the valve plate 105 and functions to suck the refrigerant. A spouting hole 107 is formed at the valve plate 105 and functions to spout the refrigerant. The spouting hole walls 114 are formed on the upper side of the spouting hole 107. A valve plate groove 108 is formed on the upper side of the valve plate 105, and end edges a, b are formed slightly higher than the spouting hole 107 and designed to enable the setting of a valve spring 110 within the valve plate groove 108. A spouting valve 109 is formed between the valve plate 105 and the packing cover 117, and functions to control the spouting of the refrigerant. A packing cover 117 prevents the leaking of the refrigerant which spouts in front of the spouting valve 109. A packing cover spouting hole 118 is located in the packing cover 117. A valve spring 110 substains an elasticity capable of preventing moving of the spouting valve 109. A retainer is connected on the valve plate groove 108 and functions to fix the valve spring 110 and to limit the movement height of the spouting valve. A guide 112 is formed at the lower part of the retainer 111 and is designed to prevent the moving of the spouting valve to both right and left. A guide groove 113 is formed to enable the reciprocating of the valve spring 110 within the circumference of the guide 112.

The motion and operational effectiveness of the newly invented compressor are as indicated in the FIGS. 3 and 4. When the piston starts its reverse movement (suction stroke) inside the cylinder 101, the low-temperature and low-pressure refrigerant being sucked into the headcover is further sucked into the cylinder 101 after passing through the packing cover suction hole 118 formed at the packing cover 117 and the suction hole 106 formed at the valve plate 105.

At this time, by the pressure difference between the insides of the headcover and the cylinder 101, the suction valve is opened, and the low-temperature and low-pressure refrigerant is sucked into the cylinder 101 until the piston reaches its bottom dead center.

The suction valve 102 is then hung up on the suction valve limiter 104 formed on the upper side of the cylinder 101.

When the piston terminates the reverse movement (suction stroke) and starts its forward movement (compression stroke) inside the cylinder 101, the suction hole 106 is closed, and the low-temperature and low-pressure refrigerant being sucked in the cylinder 101 is compressed into high-temperature and high-pressure refrigerant within the cylinder 101.

When the refrigerant to be compressed into high-temperature and high-pressure refrigerant inside the cylinder 101 reaches a certain degree of pressure (termination of the compression stroke) the internal pressure of the cylinder 101 becomes higher than that of the headcover. The high-temperature and high-pressure refrigerant then opens the spouting valve 109 flowing through the spouting hole 107 formed at the valve plate 105 and is subsequently spouted out into the headcover.

The high-temperature and high-pressure refrigerant spouted in the headcover is then spouted into the closed container. The refrigerant is again sent to the refrigerant cycle's condenser through the spouting pipe established at the closed container.

At the refrigerant cycle's condenser, the spouting valve 109 forms a round block which is slightly bigger than the spouting hole 107 at the valve plate 105 to prevent leaking of the refrigerant. The round block is formed as a plate in a round shape. The spouting valve 107 is placed on the spouting hole 109 without fixing it to control the spouting of the refrigerant.

During the opening and closing of the spouting valve 109, an elastic valve spring 110 is set on the top of the spouting valve 109 to prevent the moving of the spouting valve 109 upward. To prevent the moving of the spouting valve to both right and left sides, the guide 112 is also set an the lower part of the retainer 111 which is limits the movement height of the spouting valve 109. The spouting valve 109 and the valve sprang 110 are easily opened even at low pressure to provide a small opending for the refrigerant.

The guide groove 113 is permits the valve spring 110 to make reciprocating motions around the circumference of the guide 112 established at the lower part of the retainer 111.

In order to safely place the spouting valve 109 and the valve spring 110 in the valve plate groove 108 formed on the upper side of the valve plate 105, plastic deformation of the valve spring 110 is required to define opening direction. The valve spring 110 safely placed in the valve plate groove 108 is fixed on its one side by the retainer 111 limiting the movement height of the spouting valve 109.

In order to safely place the valve spring 110 within the valve plate groove 108, edges a and b are formed. One edge of the valve spring 110 is placed on the edges a and is fixed by the retainer 111. The other edge of the valve spring 110 is placed on the edge b. The edge b should be placed higher than that of a.

The edges a and b must be placed higher than the walls 114 of the spouting hole 107 so as to safely place the valve spring 110 within the valve plate groove 108. In the meantime, the walls 114 of the spouting hole 109 should be minimized so as to reduce the gap volume of the spouting hole 107 to enable smooth spouting of the refrigerant.

When the retainer 111 is safely placed and connected with the valve plate groove 108, both edges of the upper side of the retainer 111 should be formed with the same height of the upper side of the valve plate 105. The center of the retainer 111 should be deformed into a shape similar to that of a bow so as to help smooth the motion of the spouting valve 109.

In order to prevent the retainer 111 from breaking away from the valve plate groove 108, the both ends of upper side of the retainer 111 should be fixed by the packing cover 117.

As it was explained above, this invention minimizes the height of the spouting hole formed at the valve plate so as to reduce the gap volume and the resistance of flow present during the spouting of the refrigerant in order to help smooth the spouting of the refrigerant. In addition to the above, by placing and not fixing on the spouting hole, a spouting valve consisting of a round block slightly bigger than the spouting hole on the valve plate, the spouting valve can be easily opened or closed even at the small gap of pressure, thus the refrigerant is spouted without being over compressed. Because of this, the amount of the refrigerant sucked into the cylinder is increased, and the density of the sucked refrigerant is also increased, resulting in improved efficiency of the hermetic reciprocating compressor.

What is claimed is:

1. A valve system for a hermetic reciprocating compressor comprising:

spouting valve means to open and close a spouting hole formed at a valve plate having a valve plate groove, said valve plate restricting the movement of a suction valve means and said spouting valve means; said spouting valve means established adjacent to the suction valve means and positioned within said valve plate groove, said spouting valve means includes a separate unattached round plate to control the spouting of refrigerant from said spouting hole;

elastic plate means spaced apart above the spouting valve means to open and close the spouting hole even at low pressure, the spouting valve means and elastic means providing a small opening for the refrigerant;

movement height limiting means for limiting movement height of the spouting valve means while being connected within a refrigerant leakage preventive means, said movement height limiting means includes a bow shaped retainer for limiting the movement height of the spouting valve means, said retainer being connected with said valve plate groove, said refrigerant leakage preventive means includes a packing cover with two ends, wherein both ends are pressing and fixing an upper side of the retainer so as to prevent the retainer from breaking away from the valve plate groove; and spouting valve breakaway preventive means preventing breakaway of the spouting valve means, said preventive means is located at a lower part of the movement height limiting means, said spouting valve breakaway preventive means includes a guide at a lower part of the retainer for preventing the breakaway of the spouting valve to open and close the spouting hole, said guide has a guide groove within a circumference of the guide so as to enable reciprocating motion of the elastic plate means.

2. The valve system in accordance with claim 1, wherein said elastic plate means includes a valve spring placed on the spouting valve means, both said valve spring and said spouting valve means are opened and closed by low pressure to provide said small opening for said refrigerant.

3. The valve system in accordance with claim 2, wherein a first edge and a second edge located on both sides of the valve plate groove are formed higher than a wall height of the spouting hole so as to safely place the valve spring in the valve plate groove.

4. The valve system in accordance with claim 3, wherein said second edge has a higher height than said first edge.

5. The valve system in accordance with claim 3, wherein an edge of said valve spring is fixed on the said first edge of said valve plate groove by the retainer while another edge of the valve spring is placed on the second edge of said valve plate groove.

6. The valve system in accordance with claim 2, wherein said valve spring is plastically deformed to define its opening direction.

7. The valve system in accordance with claim 2, wherein an edge of said valve spring is fixed on a first edge of said valve plate groove by the retainer while another edge of the valve spring is placed on a second edge of said valve plate groove.

8. The valve system in accordance with claim 1, wherein a wall height of the spouting hole is minimized to reduce the gap volume of the spouting hole so as to help smoothly spout out the refrigerant.

9. The valve system in accordance with claim 1, wherein said spouting valve means has a bigger size than the spouting hole to prevent the leaking of the refrigerant.

10. The valve system in accordance with claim 1, wherein both ends at an upper side of the retainer are at the same height as an upper side of the valve plate.

* * * * *